United States Patent
Schutz et al.

(10) Patent No.: US 10,889,038 B2
(45) Date of Patent: Jan. 12, 2021

(54) PRODUCTION PLANT FOR PRODUCING A MULTIPLICITY OF ARTICLES, AND METHOD FOR CONTROLLING AND/OR MONITORING THE PRODUCTION PLANT

(71) Applicant: Phoenix Contact GmbH & Co. KG, Blomberg (DE)

(72) Inventors: Alexander Schutz, Paderborn (DE); Sebastian Faltinski, Lemgo (DE); Marco Bester, Lemgo (DE); Jorg Oblotzki, Bad Salzulfen (DE)

(73) Assignee: PHOENIX CONTACT GmbH & Co. KG, Blomberg (DE)

( * ) Notice: Subject to any disclaimer, the term of this patent is extended or adjusted under 35 U.S.C. 154(b) by 49 days.

(21) Appl. No.: 16/305,958

(22) PCT Filed: May 30, 2017

(86) PCT No.: PCT/EP2017/063046
§ 371 (c)(1),
(2) Date: Nov. 30, 2018

(87) PCT Pub. No.: WO2017/207575
PCT Pub. Date: Dec. 7, 2017

(65) Prior Publication Data
US 2019/0210261 A1    Jul. 11, 2019

(30) Foreign Application Priority Data

Jun. 1, 2016    (DE) .................. 10 2016 209 583

(51) Int. Cl.
*B29C 45/76* (2006.01)
*G05B 19/042* (2006.01)

(52) U.S. Cl.
CPC ............ *B29C 45/76* (2013.01); *G05B 19/042* (2013.01); *B29C 2945/76083* (2013.01); *B29C 2945/76451* (2013.01); *G05B 2219/2624* (2013.01)

(58) Field of Classification Search
CPC .......... B29C 2945/76083; B29C 2945/76491; B29C 45/76; G05B 19/042; G05B 2219/2624
See application file for complete search history.

(56) References Cited

U.S. PATENT DOCUMENTS

| | | |
|---|---|---|
| 2004/0022227 A1 | 2/2004 | Lynch et al. |
| 2004/0184801 A1 | 9/2004 | Vraa et al. |
| | (Continued) | |

FOREIGN PATENT DOCUMENTS

| | | |
|---|---|---|
| AT | 514309 A2 | 11/2014 |
| CN | 1344971 A | 4/2002 |
| | (Continued) | |

OTHER PUBLICATIONS

International Search Report, dated Jul. 26, 2017 (3 pages).

*Primary Examiner* — Yuhui R Pan
(74) *Attorney, Agent, or Firm* — Occhiuti & Rohlicek LLP

(57) ABSTRACT

A method for controlling and/or monitoring a production plant for producing a multiplicity of articles, wherein the production plant has a machine tool; a machine tool part which interacts with the machine tool in order to produce an article; an RFID transponder connected to the machine tool part; two RFID reading devices which are arranged at a distance from one another and from the machine tool; and a control device which is connected to the RFID reading devices via data lines. The method includes determining a first location of the machine tool part at a first time with the first RFID reading device and/or with the second RFID reading device; and determining a second location of the (Continued)

Figure 1:
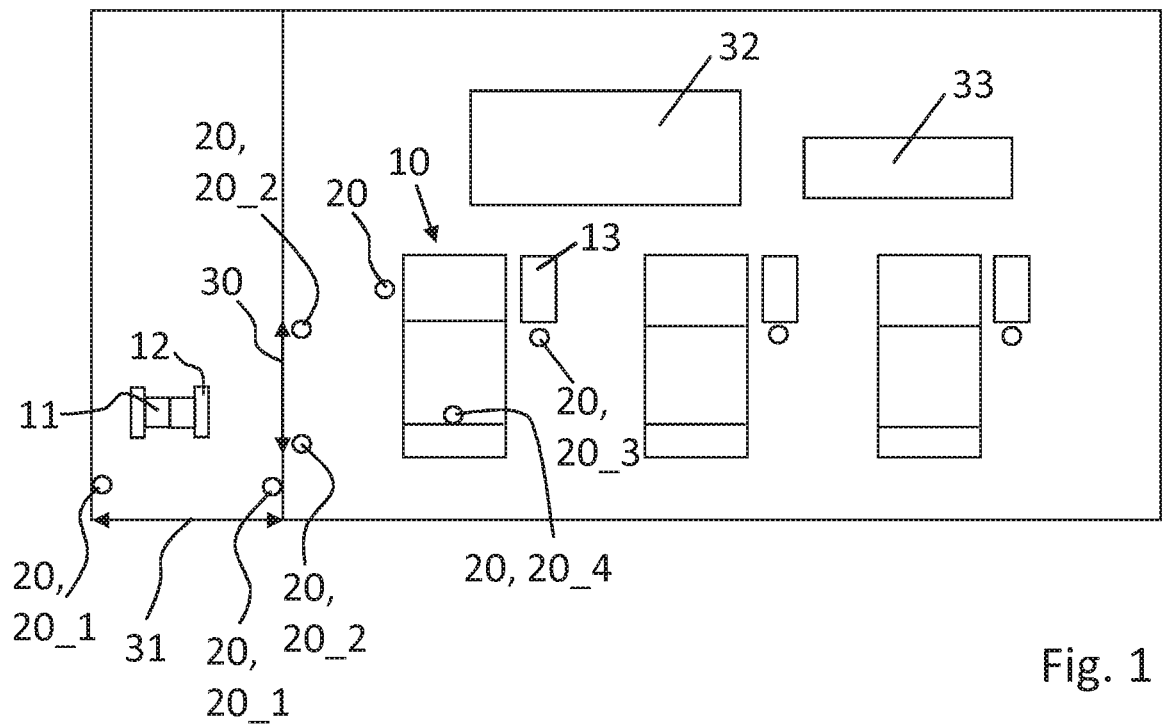

machine tool part at a second time, which temporally follows the first time, with the first RFID reading device and/or with the second RFID reading device; and outputting at least one control signal with the control device on the basis of the first location and the second location.

17 Claims, 2 Drawing Sheets

(56) References Cited

U.S. PATENT DOCUMENTS

| | | | |
|---|---|---|---|
| 2006/0077039 A1 | 4/2006 | Ibi et al. | |
| 2011/0106288 A1 | 5/2011 | Catoen et al. | |
| 2012/0119882 A1* | 5/2012 | Horst | G06K 7/0008 340/10.1 |
| 2013/0233922 A1* | 9/2013 | Schoening | G06Q 10/087 235/385 |
| 2014/0022059 A1 | 1/2014 | Horst et al. | |
| 2017/0220995 A1 | 8/2017 | Paulweber et al. | |

FOREIGN PATENT DOCUMENTS

| | | |
|---|---|---|
| CN | 1755704 A | 4/2006 |
| CN | 101957924 A | 1/2011 |
| CN | 103329142 A | 9/2013 |
| CN | 104221035 A | 12/2014 |
| DE | 102006024904 A1 | 11/2007 |
| DE | 60133378 T2 | 1/2009 |
| DE | 102013108277 | 6/2014 |
| EP | 0491657 A1 | 4/1992 |
| EP | 2664973 A2 | 11/2013 |
| JP | 2007-95006 A | 4/2007 |
| JP | 2008-266007 A | 11/2008 |
| JP | 2008-297057 A | 12/2008 |
| JP | 2008-299807 A | 12/2008 |
| KR | 1020120062961 | 6/2012 |
| RU | 153614 U1 | 7/2015 |
| WO | 2005001741 A1 | 1/2005 |
| WO | 2012012581 A1 | 1/2012 |
| WO | 2012162014 A1 | 11/2012 |
| WO | 2016/016420 A1 | 2/2016 |

* cited by examiner

PRODUCTION PLANT FOR PRODUCING A MULTIPLICITY OF ARTICLES, AND METHOD FOR CONTROLLING AND/OR MONITORING THE PRODUCTION PLANT

CROSS-REFERENCE TO RELATED APPLICATIONS

This application is the national stage under 35 USC 371 of international application PCT/EP2017/063046, filed on May 30, 2017, which claims the benefit of the Jun. 1, 2016 priority date of German application DE 10 2016 209 583.8.

The present invention relates to a production plant for producing a multiplicity of articles. The present invention also relates to a method for controlling and/or monitoring a production plant for producing a multiplicity of articles.

The method according to the invention is described below, by way of example, on the basis of a production plant for producing injection-molded articles. In this case, the production plant has a machine tool in the form of an injection molding machine. It goes without saying that the method according to the invention can also be applied to other production plants.

DE 10 2013 109 910 A1 discloses the practice of arranging an RFID reader inside an injection molding machine, which RFID reader can be used to identify machine tool parts inside the injection molding machine. For this purpose, the machine tool parts which can be inserted into the injection molding machine and are in the form of injection molds, for example, have RFID transponders, with the result that the RFID reader can be used to determine which injection molds have been installed in the injection molding machine.

In order to make a corresponding injection molding machine known from the prior art ready for operation and production, it must first be determined what type of injection-molded article is intended to be produced. The injection molds needed to produce these injection-molded articles are then identified. The injection molds are usually stored in a store of the production plant and must be searched for in the store by an employee and conveyed out of the store. The injection molds are then usually conveyed to the position of the injection molding machine by means of a forklift truck, whereupon the injection molds are installed in the injection molding machine by appropriately trained personnel. The operating parameters, for example the necessary quantity of material, the article volume, the shot weight, a temperature control plan, the production volume, etc., are then set by the personnel.

It is clear that, in the injection molding machine known from DE 10 2013 109 910 A1, the individual work steps are carried out sequentially by the operating personnel of the injection molding machine. For example, the operating parameters needed to produce an injection-molded article are set only after the injection molds have been installed in the injection molding machine. This results in a considerable delay before the production of the injection-molded articles to be produced by means of the injection molding machine can start.

The present invention is based on the object of providing a method for controlling and/or monitoring a production plant for producing a multiplicity of articles, which method can be used to improve the utilization of the production plant.

The object on which the present invention is based is achieved by means of the method described in claim 1.

Advantageous configurations of the method are described in the methods dependent on claim 1.

More precisely, the object on which the present invention is based is achieved by means of a method for controlling and/or monitoring a production plant for producing a multiplicity of articles, wherein the production plant has at least one machine tool, at least one machine tool part which interacts with the machine tool for producing an article, at least one RFID transponder which is connected to the machine tool part, at least two RFID reading devices which are arranged at a distance from one another and from the machine tool, and at least one control device which is connected to the RFID reading devices via data lines. In this case, the method according to the invention has the following method steps of:

determining a first location of the machine tool part at a first time by means of the first RFID reading device and/or by means of the second RFID reading device;

determining a second location of the machine tool part at a second time, which temporally follows the first time, by means of the first RFID reading device and/or by means of the second RFID reading device; and outputting at least one control signal by means of the control device on the basis of the first location and the second location.

The method according to the invention affords the advantage that a movement of a machine tool part can be determined, with the result that a control signal can be output on the basis of a change in the location of the machine tool part or on the basis of retention of the location of a machine tool part.

The control signal may be, for example, a control signal for opening a door or a gate or the like of the production plant, with the result that the mold part can be conveyed from one section of the production plant to another section of the production plant through the door. Furthermore, the control signal may be a temperature setting of the machine tool, for example. Furthermore, it is also possible for a pick-up order for the machine tool part from a particular location of the production plant to act by means of the control signal. In this respect, there are no restrictions with respect to the control signals.

In the method steps for determining the locations of the machine tool part, the locations are determined at a first time and at a second time and are then transmitted to the control device via a data line for further processing.

The machine tool may be an injection molding machine, for example. The mold part may accordingly be an injection mold or a plastic mold. In the case of a corresponding design of the production plant with a machine tool in the form of an injection molding machine and a machine tool part in the form of an injection mold, the machine tool part interacts with the machine tool by virtue of the machine tool part being installed in the machine tool and an injection molding compound being injected into the machine tool part.

The control device is preferably also connected to the machine tool via a data line. The data lines are preferably wireless data lines. Further preferably, information which is specific to the mold part and can be read by means of the RFID reading devices and can be transmitted to the control device is stored on the RFID transponders connected to the mold parts. As an alternative or in addition to storing the information specific to the mold part on the RFID transponders, the information specific to the mold part can be stored in a database system. These data stored in the database system are linked to the RFID transponders. Only a unique ID of the RFID transponder can be read, for example.

If the production plant has a multiplicity of machine tool parts, the production plant preferably has a number of RFID transponders corresponding to the number of machine tool parts, which RFID transponders are each connected to a machine tool part. An RFID transponder can be connected to a machine tool part, for example, by accommodating the RFID transponder in a cavity of the machine tool part.

Furthermore, it is also possible for the RFID transponders to be connected to the respective machine tool parts by adhesive bonding, welding or by means of a form-fitting connection.

The method according to the invention can be designed in such a manner that a control signal is output on the basis of the first location and the second location of the mold part by determining a movement trajectory or a direction of movement of the machine tool part by means of the first and second locations of the mold part. If, for example, it is determined by means of this direction of movement that the mold part is moving toward the machine tool, a control signal for heating or preheating the machine tool can be output, for example.

The method is preferably designed in such a manner that a control signal is additionally output on the basis of a time difference between the first time and the second time.

The accordingly designed method affords the advantage that, in addition to the direction of movement, the speed of movement of the machine tool part can also be determined. For example, it is possible to determine the time at which the machine tool part arrives at the machine tool, with the result that corresponding interference signals for preparing a production process can be output in advance. This enables improved use of the production plant.

In the case of a production plant having at least two machine tool parts which are each connected to an RFID transponder and interact with the machine tool for producing an article, the method is further preferably designed to carry out the following method steps:
  determining the locations of the machine tool parts at a first time by means of the first RFID reading device and/or by means of the second RFID reading device;
  determining the locations of the machine tool parts at a second time, which temporally follows the first time, by means of the first RFID reading device and/or by means of the second RFID reading device; and
  outputting at least one control signal by means of the control device on the basis of the locations of the machine tool parts at the first time and at the second time.

The accordingly designed method affords the advantage that different control signals can be output to the production plant on the basis of the directions of movement of the first machine tool part and of the second machine tool part. This makes it possible to take into account different situations, with the result that the production plant can be used even more effectively.

In the case of a production plant in which information which is specific to the machine tool part and can be read by the RFID reading devices is stored on the RFID transponders, the method is preferably designed to output the at least one control signal by means of the control device on the basis of the information specific to the machine tool part.

The accordingly designed method affords the advantage that the machine tool can be prepared for the imminent production process in an even more targeted manner, for example. For example, information specific to the machine tool part and therefore information specific to the article, for example the quantity of material needed to produce the article, the article volume of the article to be produced, the shot weight of the article to be produced, a required cycle time of the article to be produced, a temperature control plan for producing the article and similar further information, can be transmitted to the machine tool by means of control signals.

In the case of a production plant in which a third RFID reading device is arranged inside the machine tool and/or adjacent to the machine tool, the method is further preferably designed to output the at least one control signal by means of the control device on the basis of information determined by means of the third RFID reading device.

According to another preferred embodiment, the method is characterized in that a direction of movement of at least one machine tool part is determined on the basis of its first location and its second location by means of the control device, and in that at least one control signal is output on the basis of the direction of movement of the at least one machine tool part.

According to another preferred embodiment, the method is characterized in that a speed of movement of at least one machine tool part is determined on the basis of its first location, its second location and a time difference between the first time and the second time by means of the control device, and in that the at least one control signal is output on the basis of the speed of movement of the at least one machine tool part.

The object on which the present invention is based is also achieved by means of a production plant for producing a multiplicity of articles, wherein the production plant has at least one machine tool, at least one machine tool part which interacts with the machine tool for producing an article, at least one RFID transponder which is connected to the machine tool part, at least two RFID reading devices which are arranged at a distance from one another and from the machine tool, and at least one control device which is connected to the RFID reading devices via data lines, wherein the production plant is characterized in that the production plant carries out a method as claimed in one of claims 1, 2, 6 and 7.

The production plant is preferably designed in such a manner that the production plant has at least two machine tool parts which interact with the machine tool for producing an article, and at least two RFID transponders which are each connected to a machine tool part, wherein the production plant is characterized in that the production plant carries out a method as claimed in one of claims 1, 2, 3, 6 and 7.

The production plant is further preferably designed in such a manner that information which is specific to the machine tool part and can be read by the RFID reading devices is stored on the RFID transponders, wherein the production plant is characterized in that the production plant carries out a method as claimed in one of claims 1, 2, 3, 4, 6 and 7.

According to another preferred embodiment, the production plant is designed in such a manner that a third RFID reading device is arranged inside the machine tool and/or adjacent to the machine tool, wherein the production plant is characterized in that the production plant carries out a method as claimed in one of claims 1 to 7.

Figure 2:
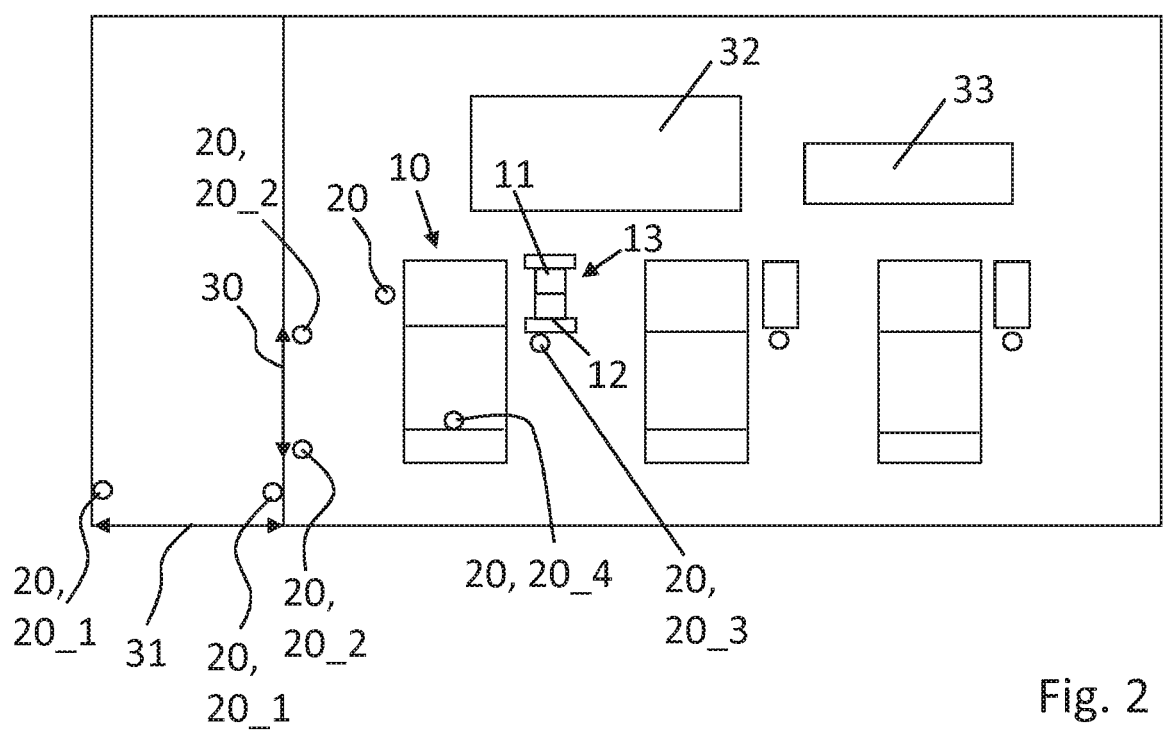
Figure 3:
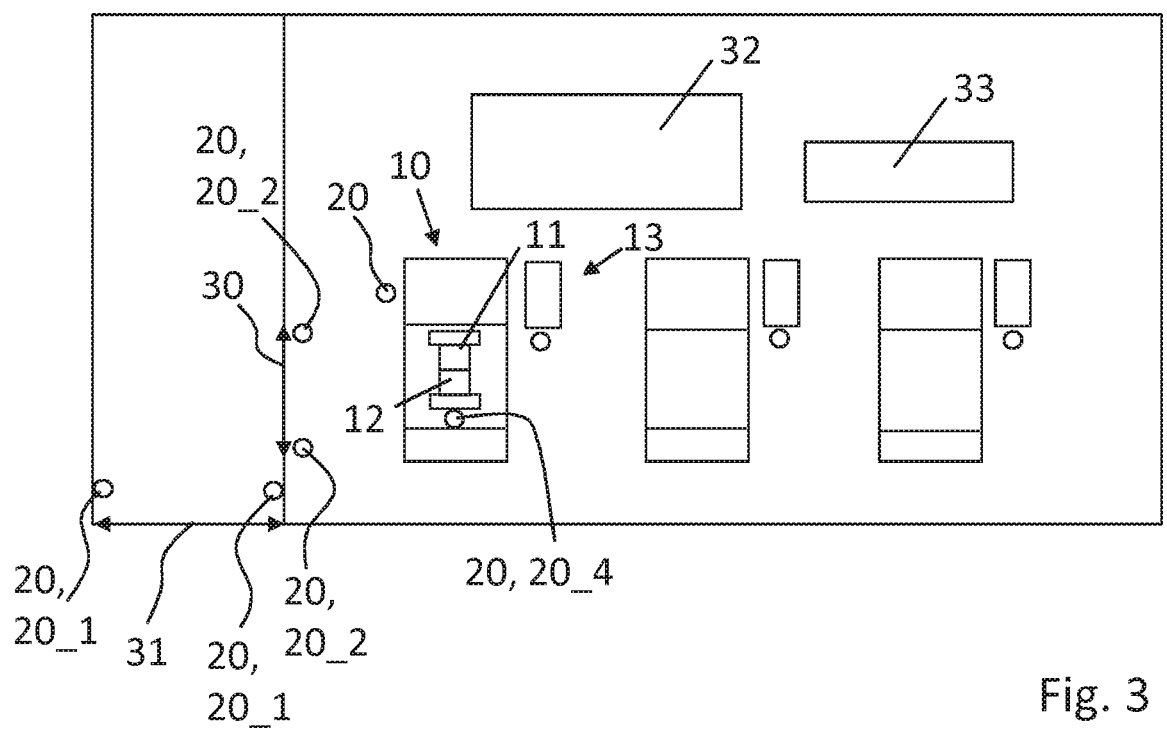
Figure 4:
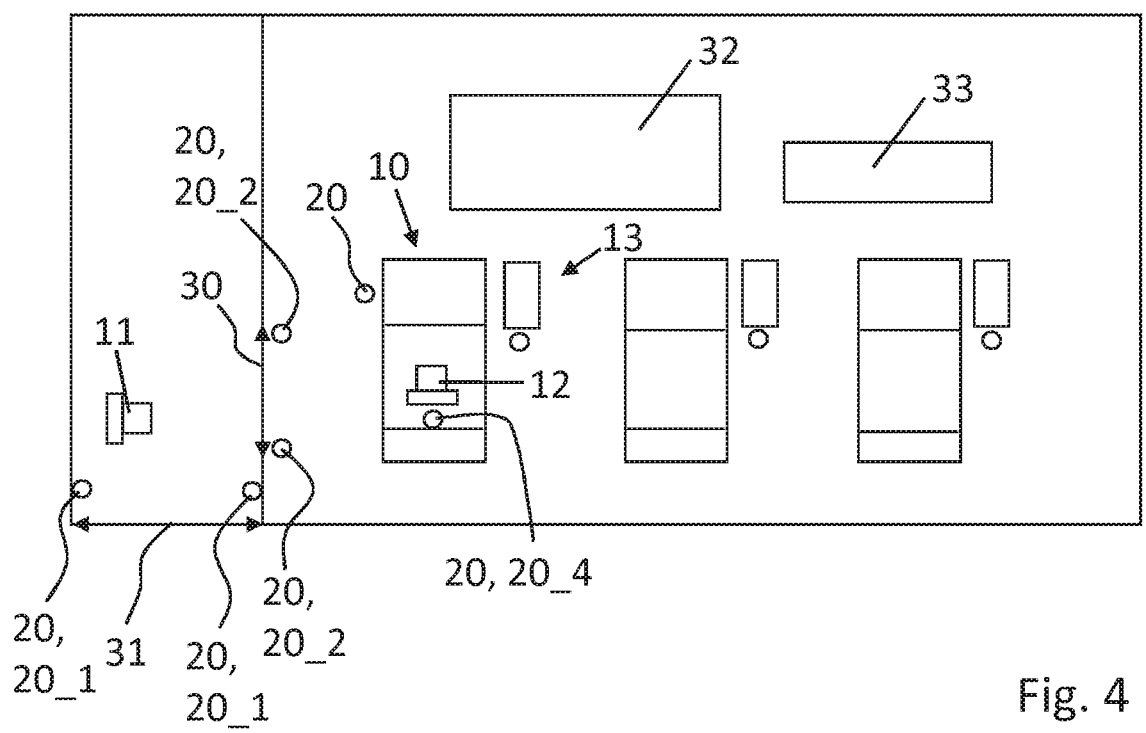

Further advantages, details and features of the invention emerge below from the exemplary embodiments explained. In the drawings, in detail:

FIG. 1: shows a production plant according to the invention in a first state;

FIG. 2: shows the production plant illustrated in FIG. 1 in a second state;

FIG. 3: shows the production plant illustrated in FIGS. 1 and 2 in a third state; and FIG. 4: shows the production plant illustrated in FIGS. 1 to 3 in a fourth state.

In the description which now follows, identical reference signs denote identical components or identical features, with the result that a description of a component with respect to one figure also applies to the other figures, thus avoiding a repetitive description. Furthermore, individual features described in connection with one embodiment can also be separately used in other embodiments.

FIGS. 1 to 4 illustrate a production plant according to the invention for producing a multiplicity of articles in different states, which production plant is designed to carry out the method according to the invention. In the exemplary embodiment illustrated, the production plant is designed to produce injection-molded parts. For this purpose, the production plant has a multiplicity of machine tools 10 which are in the form of injection molding machines 10 and are arranged in a production hall of the production plant. The production hall is accessible via a rolling gate 31 and doors 30, through which machine tool parts 11, 12 in the form of injection molds 11, 12 can be transported into the production hall, for example.

The production plant has a multiplicity of RFID reading devices 20, 20_1, 20_2, 20_3, 20_4 which are arranged at a distance from one another at different locations. In this case, first RFID reading devices 20_1 are arranged adjacent to the gate 31. Second RFID reading devices 20_2 are arranged adjacent to the door 30. A third RFID reading device 20_3 is arranged adjacent to a preparation location 13 of the injection molding machine 10. A fourth RFID reading device 20_4 is arranged inside the injection molding machine 10.

The machine tool part 11 is in the form of an ejection side of the machine tool part, and the machine tool part 12 is in the form of a nozzle side of the machine tool part. The machine tool parts 11, 12 are each provided with an RFID transponder not illustrated in the figures. The RFID transponders can be read using all RFID reading devices 20. The positions of the machine tool parts 11, 12 can therefore be determined using the RFID reading devices 20.

The production plant according to the invention also has a control device which is not illustrated in the figures and is connected to all RFID reading devices 20, 20_1, 20_2, 20_3, 20_4 via data lines which are not illustrated in the figures. The data lines are preferably wireless data lines.

The production plant and the control device are designed to determine the locations of the machine tool parts 11, 12 at a first time and at a second time. A direction of movement of the machine tool parts 11, 12 can consequently be determined. The control device is also designed to output control signals on the basis of the first and second positions of the machine tool parts 11, 12. The control signals may be, for example, a control signal for opening and/or closing the gate 31, for opening and/or closing the door 30, for controlling the temperature of the injection molding machine 10, etc.

FIG. 1 illustrates a state of the production plant in which the machine tool parts 11, 12 have been transported into an entrance hall of the production hall through the gate 31 by operating personnel, for example by means of a forklift truck. The position of the machine tool parts 11, 12 is determined at a first time by means of the first RFID reading devices 20_1. The machine tool parts 11, 12 are then transported to the preparation location 13 of the injection molding machine 10. In this case, the machine tool parts pass through the door 30, with the result that the position of the machine tool parts 11, 12 at a second time is determined by the RFID reading devices 20_2 adjacent to the door 30. The control device is designed to determine a direction of movement and a speed of movement of the machine tool parts 11, 12 on the basis of the first locations, the second locations and a time difference between the first time and the second time. Control signals are output to the injection molding machine 10 on the basis of this direction of movement of the machine tool parts 11, 12 and possibly on the basis of the speed of movement of the machine tool parts 11, 12. These control signals may be, for example, a quantity of material needed to produce an article, an article volume of the article to be produced, a shot weight of the article to be produced, a temperature control plan for the injection molding machine, etc.

The position of the machine tool parts 11, 12 is determined at a third time by means of the third RFID reading devices 20_3 at the preparation location 13. This detected position can be used to output a control signal in order to inform an operative that the injection molding machine is ready for the installation of the injection molds 11, 12.

FIG. 3 illustrates the production plant in the state in which the injection molds 11, 12 have been installed in the injection molding machine 10. It is now possible to output a control signal which is used to start the production of injection-molded parts.

A state in which the ejection side of the machine tool part 11 has been removed from the injection molding machine 10 and has been conveyed into an entrance hall of the production hall through the door 30 is clear from FIG. 4. The RFID reading devices 20 detect that the nozzle side of the machine tool part 12 remains in the injection molding machine 10, whereas the ejection side of the machine tool part 11 has been removed from the injection molding machine 10 and has been transported into the entrance hall of the production hall through the door 30. Accordingly, it is then possible to output a control signal which is used to inform personnel, for example, that production is not permissible at this time. Furthermore, it is possible to output a control signal which outputs a message to a mechanic stating that a mold half is expected in the injection molding machine 10.

LIST OF REFERENCE SIGNS

10 Machine tool/injection molding machine
11 (First) machine tool part/injection mold/plastic mold/ejection side of the machine tool part
12 (Second) machine tool part/injection mold/plastic mold/nozzle side of the machine tool part
13 Preparation location (of the machine tool)
20, 20_1 (First) RFID reading device
20, 20_2 (Second) RFID reading device
20, 20_3 (Third) RFID reading device
30 Door
31 Rolling gate
32 Material store
33 Dryer

The invention claimed is:

1. A method for controlling and/or monitoring a production plant for producing a multiplicity of articles, wherein the production plant includes:
   at least one machine tool;
   two machine tool parts, the two machine tool parts cooperate with each other and the two machine tool parts interact with the machine tool for producing an article;

two Radio Frequency Identification (RFID) transponders, each of which is connected to a corresponding one of the two machine tool parts;

at least two RFID reading devices which are arranged at a distance from one another and from the machine tool; and at least one control device which is connected to the RFID reading devices via data lines, wherein the method has the following method steps of:

determining the locations of the two machine tool parts at a first time by means of the first RFID reading device and/or by means of the second RFID reading device, wherein determining the locations of the two machine tool parts at a first time includes that at most one of the two machine tool parts has been installed in the at least one machine tool;

determining the locations of the two machine tool parts at a second time, which temporally follows the first time, by means of the first RFID reading device and/or by means of the second RFID reading device, wherein determining the locations of the two machine tool parts at a second time includes determining that both of the two machine tool parts have been installed in the at least one machine tool; and having determined that both of the two machine tool parts have been installed in the at least one machine tool outputting at least one control signal by means of the control device to indicate whether production is permissible.

2. The method as claimed in claim 1, wherein a control signal is additionally output on the basis of a time difference between the first time and the second time.

3. The method as claimed in claim 1, wherein a first of the two machine tool parts and a second of the two machine tool parts are capable of cooperating with each other and interacting with the machine tool are in the form of a first injection mold half and a second injection mold half, respectively.

4. The method as claimed in claim 1, wherein information which is specific to the two machine tool parts and can be read by the at least two RFID reading devices is stored on the two RFID transponders, characterized in that the at least one control signal is output by means of the control device on the basis of the information specific to the two machine tool parts.

5. The method as claimed in claim 1, wherein a third RFID reading device is arranged inside the machine tool and/or adjacent to the machine tool, wherein at least one control signal is output by means of the control device on the basis of information determined by means of the third RFID reading device.

6. The method as claimed in claim 1, characterized by the following features:

determining a direction of movement of the two machine tool parts on the basis of its first location and its second location by means of the control device; and outputting at least one control signal on the basis of the direction of movement of the two machine tool parts.

7. The method as claimed in claim 1, wherein the following features:

determining a speed of movement of the two machine tool parts on the basis of its first location, its second location and a time difference between the first time and the second time by means of the control device; and outputting at least one control signal on the basis of the speed of movement of the two machine tool parts.

8. The method as claimed in claim 3, wherein the first injection mold half and the second injection mold half are a nozzle side machine tool part and an ejection side machine tool part.

9. The method as claimed in claim 2, wherein information which is specific to the machine tool part and can be read by the RFID reading devices is stored on the RFID transponders, characterized in that the at least one control signal is output by means of the control device on the basis of the information specific to the machine tool part.

10. The method as claimed in claim 2, wherein a third RFID reading device is arranged inside the machine tool and/or adjacent to the machine tool, wherein at least one control signal is output by means of the control device on the basis of information determined by means of the third RFID reading device.

11. The method as claimed in claim 4, wherein a third RFID reading device is arranged inside the machine tool and/or adjacent to the machine tool, wherein at least one control signal is output by means of the control device on the basis of information determined by means of the third RFID reading device.

12. A production plant for producing a multiplicity of articles, wherein the production plant comprises:

at least one machine tool;

two machine tool parts, the two machine tool parts cooperate with each other and the two machine tool parts configured to interact with the at least one machine tool for producing an article;

two RFID transponders, each of which is connected to the two machine tool parts;

at least two RFID reading devices which are arranged at a distance from one another and from the machine tool; and at least one control device which is connected to the RFID reading devices data lines, wherein that the production plant carries out a method the following steps:

determining the locations of the two machine tool parts at a first time by means of the first RFID reading device and/or by means of the second RFID reading device, wherein determining the locations of the two machine tool parts at a first time includes that at most one of the two machine tool parts has been installed in the at least one machine tool;

determining the locations of the two machine tool parts a second time, which temporally follows the first time, by means of the first RFID reading device and/or by means of the second RFID reading device, wherein determining the locations of the two machine tool parts at a second time includes determining that both of the two machine tool parts have been installed in the at least one machine tool; and having determined that both of the two machine tool parts have been installed in the at least one machine tool outputting at least one control signal by means of the control device to indicate whether production is permissible.

13. The production plant as claimed in claim 12, wherein a first of two machine tool parts and a second of the two machine tool parts which interact with the machine tool for producing an article, are capable of cooperating with each other and interacting with the machine tool and are in the form of a first injection mold half and a second injection mold half, respectively.

14. The production plant as claimed in claim 12, wherein information which is specific to the two machine tool parts and can be read by the RFID reading devices is stored on the two RFID transponders.

15. The production plant as claimed in claim 12, wherein a third RFID reading device is arranged inside the machine tool and/or adjacent to the machine tool.

16. The production plant as claimed in claim 14, wherein a third RFID reading device is arranged inside the machine tool and/or adjacent to the machine tool.

17. The production plant as claimed in claim 13, wherein the first injection mold half and the second injection mold half are a nozzle side machine tool part and an ejection side machine tool part.

\* \* \* \* \*